US010138966B2

(12) United States Patent
Usui et al.

(10) Patent No.: US 10,138,966 B2
(45) Date of Patent: Nov. 27, 2018

(54) VEHICLE BRAKE APPARATUS

(71) Applicant: NISSIN KOGYO CO., LTD., Ueda, Nagano (JP)

(72) Inventors: Koji Usui, Nagano (JP); Toshiaki Mitani, Nagano (JP); Hiroo Kawakami, Nagano (JP); Akira Hiratsuka, Nagano (JP)

(73) Assignee: NISSIN KOGYO CO., LTD., Nagano (JP)

( * ) Notice: Subject to any disclaimer, the term of this patent is extended or adjusted under 35 U.S.C. 154(b) by 0 days.

(21) Appl. No.: 14/642,828

(22) Filed: Mar. 10, 2015

(65) Prior Publication Data

US 2015/0260245 A1    Sep. 17, 2015

(30) Foreign Application Priority Data

Mar. 11, 2014 (JP) ................................. 2014-047733
Mar. 11, 2014 (JP) ................................. 2014-047734
Mar. 26, 2014 (JP) ................................. 2014-064789

(51) Int. Cl.
*F16D 65/22* (2006.01)
*F16D 65/28* (2006.01)
*F16D 51/42* (2006.01)
*F16D 51/24* (2006.01)
*F16D 65/56* (2006.01)
*F16D 121/24* (2012.01)
*F16D 51/00* (2006.01)
(Continued)

(52) U.S. Cl.
CPC ............. *F16D 65/22* (2013.01); *F16D 51/24* (2013.01); *F16D 65/28* (2013.01); *F16D 65/563* (2013.01); *F16D 2051/003* (2013.01); *F16D 2121/24* (2013.01); *F16D 2125/40* (2013.01); *F16D 2125/62* (2013.01)

(58) Field of Classification Search
CPC ........... F16D 65/22; F16D 65/28; F16D 51/24
USPC .................................................. 188/2 D, 265
See application file for complete search history.

(56) References Cited

U.S. PATENT DOCUMENTS 3,037,584 A * 6/1962 Thornton ................ F16D 65/09
                                                    188/326
5,896,958 A    4/1999 Ludke et al.
(Continued)

FOREIGN PATENT DOCUMENTS

CN           1154735        7/1997
DE      102012201579 A1     8/2012
(Continued)

OTHER PUBLICATIONS

Extended European Search Report in related International Application No. 1518622.9 dated Apr. 25, 2016.
(Continued)

*Primary Examiner* — Thomas J Williams
*Assistant Examiner* — James K Hsiao
(74) *Attorney, Agent, or Firm* — Andrew M. Calderon; Roberts Mlotkowski Safran Cole & Calderon, P.C.

(57) ABSTRACT

One embodiment provides a vehicle brake apparatus, including: an electric actuator; and a drum brake. The drum brake is attached to a wheel so as to be driven by power exhibited by the electric actuator. In a state of being mounted on a vehicle, the electric actuator is disposed and fixed further rearwards than an axle of the wheel.

16 Claims, 13 Drawing Sheets

(51) Int. Cl.
*F16D 125/40* (2012.01)
*F16D 125/62* (2012.01)

(56) References Cited

U.S. PATENT DOCUMENTS

| | | | | |
|---|---|---|---|---|
| 6,086,162 | A * | 7/2000 | Pinch | B60G 3/145 228/185 |
| 6,213,259 | B1 * | 4/2001 | Hanson | B60T 7/107 188/156 |
| 6,684,988 | B2 * | 2/2004 | Kapaan | F16D 51/20 188/162 |
| 6,755,284 | B2 * | 6/2004 | Revelis | B60T 7/107 188/162 |
| 7,090,233 | B2 * | 8/2006 | Shin | B60G 7/008 280/124.153 |
| 7,510,197 | B2 * | 3/2009 | Gottschalk | B60B 35/06 280/86.5 |
| 7,862,059 | B2 * | 1/2011 | Ko | B60G 21/051 280/124.116 |
| 7,862,129 | B2 * | 1/2011 | Jeon | B60T 13/746 188/156 |
| 8,210,326 | B2 * | 7/2012 | Kim | B60T 11/046 188/156 |
| 8,215,462 | B2 * | 7/2012 | Planas Girona | B60T 7/04 188/2 D |
| 8,235,181 | B2 * | 8/2012 | Sano | B60T 13/746 188/156 |
| 8,475,075 | B2 * | 7/2013 | Toepker | B23K 11/14 280/124.133 |
| 9,175,737 | B2 * | 11/2015 | Bach | F16D 51/16 |
| 9,180,749 | B2 * | 11/2015 | Baumer | B60G 11/189 |
| 9,587,692 | B2 * | 3/2017 | Gutelius | F16D 65/18 |
| 2003/0150676 | A1 | 8/2003 | Ohnishi et al. | |
| 2005/0250382 | A1 * | 11/2005 | Mourad | B60T 7/107 439/578 |
| 2006/0016642 | A1 * | 1/2006 | Deutloff | B60T 7/107 188/2 D |
| 2006/0289254 | A1 * | 12/2006 | Tsukagoshi | F16D 51/24 188/218 R |
| 2007/0169578 | A1 * | 7/2007 | Christensen | F16H 25/2021 74/89.37 |
| 2009/0260929 | A1 * | 10/2009 | Boyle | B60T 13/746 188/156 |
| 2012/0205209 | A1 * | 8/2012 | Tsuzuku | F16D 51/20 188/325 |
| 2013/0087418 | A1 * | 4/2013 | Han | B60T 7/107 188/78 |
| 2014/0020997 | A1 | 1/2014 | Bach et al. | |

FOREIGN PATENT DOCUMENTS

| | | |
|---|---|---|
| JP | S55136641 | 10/1980 |
| JP | S61153661 | 9/1986 |
| JP | H0430328 | 3/1992 |
| JP | H10267059 | 10/1998 |
| JP | H11099934 | 4/1999 |
| JP | 20000170806 | 6/2000 |
| JP | 2002-221244 | 8/2002 |
| JP | 2003156080 | 5/2003 |
| JP | 2003240030 | 8/2003 |
| JP | 2006132616 | 5/2006 |
| JP | 2007-218361 | 8/2007 |
| JP | 2011099458 | 5/2011 |
| JP | 2013124696 | 6/2013 |
| JP | 2013228011 | 7/2013 |
| JP | 2014504711 | 2/2014 |
| JP | 2014058994 | 3/2014 |
| JP | 2014025542 | 6/2014 |
| WO | 9221542 | 12/1992 |

OTHER PUBLICATIONS

Japanese Office Action in related Application No. 2014-047733 dated May 10, 2017, 6 pages.
Japanese Office Action in related Application No. 2014-064789 dated May 10, 2017, 8 pages.
Chinese Office Action in related Application No. 201510323314.X dated Sep. 11, 2017, 18 pages.
Japanese Office Action in related Application No. 2014-047733 dated Dec. 27, 2017, 6 pages.
Japanese Office Action in related Application No. 2014-047733 dated Jul. 18, 2018, 6 pages.

* cited by examiner

VEHICLE BRAKE APPARATUS

CROSS-REFERENCE TO RELATED APPLICATION(S)

This application claims priorities from Japanese Patent Application Nos. 2014-047733 filed on Mar. 11, 2014, 2014-047734 filed on Mar. 11, 2014, 2014-064789 filed on Mar. 26, 2014, the entire contents of which are incorporated herein by reference.

FIELD

Embodiments described herein relate generally to a vehicle brake apparatus which includes an electric actuator and a drum brake which is attached to a wheel so as to be driven by power exhibited by the electric actuator.

The embodiments further relate to a vehicle brake apparatus in which wheel brakes which are activated to operate by an electric actuator when a vehicle is parked are provided individually on left and right rear wheels.

The embodiments still further relate to a vehicle brake apparatus which includes a drum brake in which brake shoes which are brought into friction contact with a brake drum which rotates together with a wheel are supported rotatably on a backing plate which is disposed and fixed to a suspension which supports the wheel in a suspended fashion and an electric actuator which can exhibit power by which the brake shoes are driven to rotate.

BACKGROUND

JP-2013-124696-A discloses a vehicle brake apparatus in which an electric actuator is attached to a knuckle which is joined to a backing plate of a drum brake in a position located further downwards than an axle of a wheel to which the drum brake is attached.

In the vehicle brake apparatus of JP-2013-124696-A, however, the electric actuator tends to interfere with a suspension constituent part such as a trailing arm easily, reducing the degree of freedom in laying out the electric actuator.

JP-2002-221244-A discloses a vehicle brake apparatus in which wheel brakes on left and right rear wheels are driven to by an electric actuator disposed substantially at the center of a vehicle to produce a parking brake applied state.

In the vehicle brake apparatus of JP-2002-221244-A, however, the electric actuator is disposed substantially at the center of the vehicle, and this requires a specific attaching construction such as a bracket for attaching the electric actuator to the vehicle. Additionally, a pair of cables need to be routed so as to branch off from the electric actuator to reach the left and right rear wheels, this reducing the degree of freedom in laying out the cables.

JP-2007-218361-A discloses a vehicle brake apparatus in which an electric actuator which drives a drum brake which is mounted on a wheel as a parking drum brake is provided in a position lying away from a backing plate of the drum brake.

In the vehicle brake apparatus of JP-2007-218361-A, however, the attachment of the electric actuator to the body of a vehicle becomes complex, and the electric actuator has to be disposed in the position where the electric actuator does not interfere with a suspension constituent part such as a trailing arm or a tire of the wheel to which the vehicle brake apparatus is attached. This reduces the degree of freedom in laying out the electric actuator.

SUMMARY

One object of the present invention is to provide a vehicle brake apparatus which increases the degree of freedom in laying out an electric actuator by suppressing the electric actuator from interfering with a suspension constituent part.

The present invention provides following Aspects 1-4. Numerals etc. in the brackets indicate exemplary correspondence with the reference sings used in the embodiments.

1. A vehicle brake apparatus, including:
   an electric actuator (138A, 138B); and
   a drum brake (115) which is attached to a wheel so as to be driven by power exhibited by the electric actuator (138A, 138B),
   wherein, in a state of being mounted on a vehicle, the electric actuator (138A, 138B) is disposed and fixed further rearwards than an axle (114) of the wheel.

2. The vehicle brake apparatus of Aspect 1,
   wherein the drum brake (115) has a parking brake lever (135) which is to be driven when a parking brake is applied, and the drum brake (115) is attached to the wheel in a posture such that the drum brake (115) performs a braking operation in response to an operation of the parking brake lever (135) towards the rear in a front-to-rear direction of the vehicle, and
   wherein the electric actuator (138A, 138B) is connected to the parking brake lever (135) such that, when in operation, the electric actuator (138A, 138B) drives the parking brake lever (135) towards the rear of the front-to-rear direction of the vehicle.

3. The vehicle brake apparatus of Aspect 1 or 2,
   wherein the electric actuator (138A, 138B) is attached to a backing plate (116) of the drum brake (115).

4. The vehicle brake apparatus of any one of Aspects 1 to 3,
   wherein the drum brake (115) is attached to a rear wheel.

According to Aspect 1, since the electric actuator is disposed further rearwards than the axle of the wheel to which the drum brake is attached, the electric actuator is disposed in a position such that the electric actuator is suppressed from interfering with anyone of suspension constituent parts most of which are disposed further forwards than the axle, thereby increasing the degree of freedom in laying out the electric actuator.

According to Aspect 2, the vehicle brake apparatus can preferably be applied to a known drum brake having a parking brake lever. Even in a conventionally known drum brake in which a parking brake lever is pulled towards the front of the front-to-rear direction of the vehicle to produce a parking brake applied state, the abovementioned vehicle brake apparatus can be realized by reversing the direction of the drum brakes in relation to the front-to-rear direction when they are attached to the left and right wheels. Thus, the existing drum brakes can be used effectively, thereby enhancing the applicability of the vehicle brake apparatus.

According to Aspect 3, the electric actuator is attached to the backing plate of the drum brake, which obviates the necessity of providing a specific attaching construction for attaching the electric actuator on the body of the vehicle. This enables the electric actuator to be assembled to the drum brake closely and neatly, whereby not only can the laying-out properties of the vehicle brake apparatus on the body be enhanced, but also the assemblage of the vehicle brake apparatus to the body can be facilitated.

According to Aspect 4, since it is applied to a rear wheel, it is possible to avoid the risk of stone thrown by the front wheel striking the electric actuator.

Another object of the invention is to provide a vehicle brake apparatus which can not only obviate the necessity of a specific attaching construction for attaching an electric actuator to a body of a vehicle but also enhance the degree of freedom in laying out cables.

The present invention further provides following Aspects 5-7. Numerals etc. in the brackets indicate exemplary correspondence with the reference sings used in the embodiments.

5. A vehicle brake apparatus in which wheel brakes (215) are provided individually on left and right rear wheels and are activated by an electric actuator (238) when a vehicle is parked,
wherein the electric actuator (238) is provided on one wheel brake (215) which is provided on one of the left and right rear wheels, and exhibits power to drive not only the one wheel brake (215) but also another wheel brake (215) which is provided on the other of the left and right rear wheels, and
wherein a cable (254) is routed to transfer the power from the electric actuator (238) to the another wheel brake (215).

6. The vehicle brake apparatus of Aspect 5,
wherein the wheel brakes are drum brakes (215) each having a parking brake lever (235) and producing a parking brake applied state therein in response to the parking brake lever (235) being pulled, and
wherein directions in which the parking brake levers (235) of the drum brakes (215) which are provided individually on the left and rear wheels are pulled are set opposite to each other in relation to a front-to-rear direction of the vehicle.

7. The vehicle brake apparatus of Aspect 6,
wherein the electric actuator (238) is provided on the one drum brake (215) which is provided on the one of the left and right rear wheels such that the parking brake lever (235) thereof is pulled to the rear in the front-to-rear direction of the vehicle, and in a state of being attached to the vehicle, the electric actuator (238) is positioned further rearwards then an axle (214) of the one of the left and right rear wheels.

According to Aspect 5, since the electric actuator is provided on the wheel brake of the one of the left and right rear wheels, the necessity is obviated of providing a specific attaching construction such as a bracket for attaching the electric actuator to the vehicle, and the attaching properties of the electric actuator is also enhanced. Additionally, the cable only has to be routed between the left and right rear wheels such that the cable which transfers the power from the electric actuator is routed towards the other of the left and right rear wheels and the degree of freedom in laying out routing of the cable is enhanced.

According to Aspect 6, the vehicle brake apparatus can preferably be applied to a known drum brake having a parking brake. Although the known drum brake is such that the parking brake applied state is produced by pulling the parking brake lever to the front of the front-to-rear direction of the vehicle, two such drum brakes are prepared, and a parking brake lever of one drum brake is set to be pulled towards the rear, while a parking brake lever in the other drum brake is set to be pulled to the front in the front-to-rear direction of the vehicle, whereby the known drum brakes can be used on the left and right rear wheels. This enables the effective use of the existing drum brakes and can enhance the applicability thereof.

According to Aspect 7, the electric actuator is disposed further rearwards than the axle of the one of the left and right rear wheels. This means that the electric actuator is disposed in a position such that the electric actuator is suppressed from interfering with a constituent part of the suspension most of constituent parts of which are disposed further forwards than the axle, and this can enhance the degree of freedom in laying out the electric actuator. Additionally, it is possible to avoid the risk of stone thrown by the front wheel striking the electric actuator.

Still another object of the invention is to provide a vehicle brake apparatus which suppresses an electric actuator from interfering with a suspension constituent part or a tire of a wheel to which it is attached to thereby increase the degree of freedom in laying out the electric actuator.

The present invention still further provides following Aspects 8-10. Numerals etc. in the brackets indicate exemplary correspondence with the reference sings used in the embodiments.

8. A vehicle brake apparatus, including:
a drum brake (315) including
a brake drum (310) which rotates together with a wheel,
a backing plate (316) which is disposed and fixed to a suspension (311) which supports the wheel in a suspended fashion, and
brake shoes (317, 318) which are supported on the backing plate (316) so as to be brought into friction contact with the brake drum (310); and
an electric actuator (338) which exhibits power to rotate the brake shoes (317, 318),
wherein the electric actuator (338) is attached to the backing plate (316) so as to be covered by the backing plate (316) from a transversely outer side of a vehicle.

9. The vehicle brake apparatus of Aspect 8,
wherein the backing plate (316) includes
a backing plate main portion (316a) formed into a dish-like shape, so as to accommodate a part of the brake drum (310), and
an expanding portion (316b) which expands sideways from the backing plate main portion (316a).

10. The vehicle brake apparatus of Aspect 9,
wherein the electric actuator (338) is attached to the backing plate main portion (316a) so as to be covered from the transversely outer side of the vehicle by the expanding portion (316b).

According to Aspect 8, since the electric actuator is attached to the backing plate of the drum brake, the degree of freedom in laying out the electric actuator can be enhanced by disposing the electric actuator in a position such that the electric actuator is suppressed from interfering with a suspension constituent part or a tire of the wheel to which the drum brake is attached. Since the electric actuator is covered from the transversely outer side of the vehicle by the expanding portion with the back plate, it is possible to prevent the electric actuator from being brought into contact with tires or wheels when tires are replaced.

According to Aspect 9, since the electric actuator is covered from the transversely outer side of the vehicle by the expanding portion of the backing plate, the degree of freedom in disposing the electric actuator is enhanced further.

According to Aspect 10, since the electric actuator is attached to the backing plate main portion of the backing plate, the electric actuator can be attached to the backing plate strongly and rigidly.

DETAILED DESCRIPTION

Embodiments will be described by reference to the drawings.

First Embodiment

Figure 1:
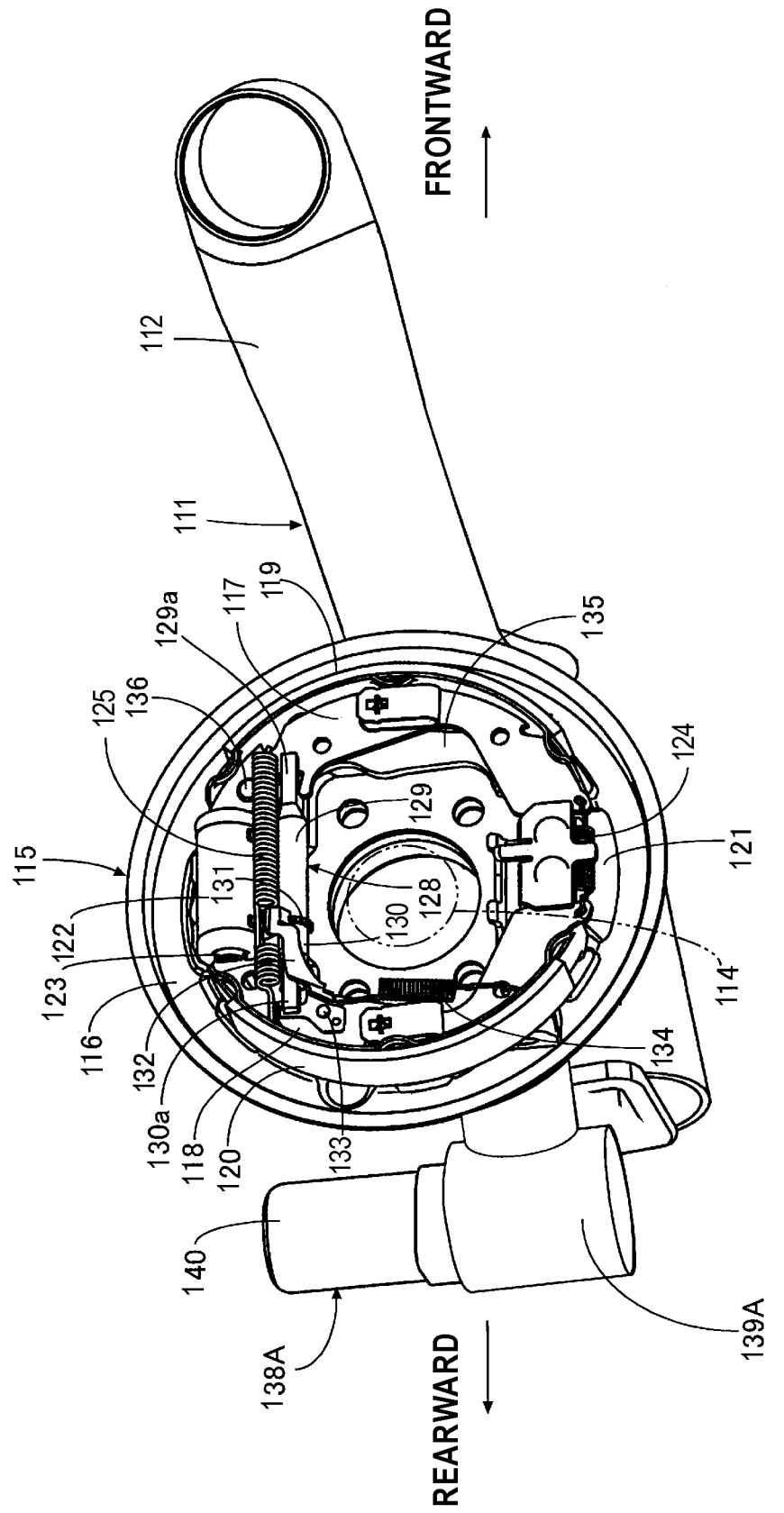
FIG. 1 is a perspective view of a main part of a right rear wheel drum brake of a first embodiment as viewed from a transversely outer side of a vehicle.
Figure 2:
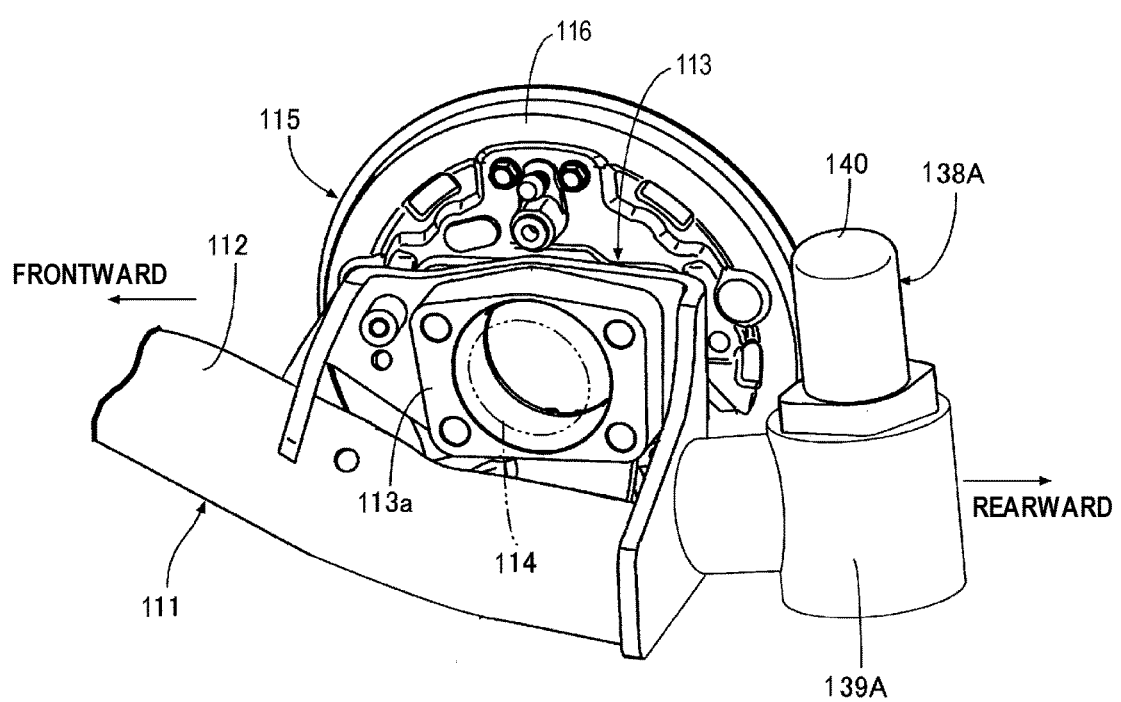
FIG. 2 is a perspective view of the main part of the right rear wheel drum brake as viewed from an opposite side to the side from which it is viewed in FIG. 1.

A first embodiment will be described by reference to FIGS. 1 to 3. A knuckle 113 having a frame portion 113a is fixed to a rear end of a trailing arm 112 extending in a front-to-rear direction of a four-wheeled vehicle which makes up part of a suspension 111 by which a right rear wheel is supported on a body of the four-wheeled vehicle in a suspended fashion. An axle 114 of the right rear wheel which is disposed on a transversely outer side of the frame portion 113a is supported rotatably on the frame portion 113a.

A backing plate 116 of a drum brake 115 which is mounted on the right rear wheel is secured to the frame portion 113a. An anchor block 121 is fixedly provided at a lower portion of the backing plate 116, and this anchor block 121 constitutes a fulcrum on which a set of front primary brake shoe 117 and rear secondary brake shoe 118 expand or contract. Friction linings 119, 120, which are configured to rotate together with the right rear wheel, are joined to outer circumferences of the primary and secondary brake shoes 117, 118, respectively, so as to be brought into sliding contact with a brake drum (not shown).

A wheel cylinder 122, which is configured to exhibit an expanding force to expand the primary and secondary brake shoes 117, 118 so as to move away from each other, is fixed to an upper portion of the backing plate 116 such that outer ends of a pair of pistons 123 of the wheel cylinder 122 face upper end portions of the primary and secondary brake shoes 117, 118.

This wheel cylinder 122 is activated to operate by a hydraulic pressure outputted from a master cylinder (not shown) which is operated by a brake pedal to thereby drive the primary and secondary brake shoes 117, 118 in a direction in which they expand.

A primary coil spring 124 is provided between lower end portions of the primary and secondary brake shoes 117, 118 so as to bias the lower end portions of the primary and secondary brake shoes 117, 118 towards the anchor block 121, while a secondary coil spring 125 is provided between the upper end portions of the primary and secondary brake shoes 117, 118 so as to bias the brake shoes 117, 118 in a direction in which they contract.

A contracting position control strut 128 is provided between upper portions of the primary and secondary brake shoes 117, 118 so as to control contracting positions of the primary and secondary brake shoes 117, 118. This contracting position control strut 128 includes a cylindrical body 129 having at one end thereof a primary engagement portion 129a which is brought into engagement with the upper portion of the primary brake shoe 117 of the primary and secondary brake shoes 117, 118, a screw shaft 130 having at the other end portion a secondary engagement portion 130a which is inserted, at one end portion thereof, into the cylindrical body 129 so as to move in an axial direction relative to the cylindrical body 129 and which is brought into engagement with the upper portion of the secondary brake shoe 118, and a ratchet wheel 131 which is screwed on the screw shaft 130 so as to be brought into abutment with the other end of the cylindrical body 129.

An adjustment lever 132 which is in engagement with an outer circumference of the ratchet wheel 131 is supported rotatably on the secondary brake shoe 118 via a pivot 133, and a tertiary coil spring 134 is provided between the secondary brake shoe 118 and the adjustment lever 132. When the primary and secondary brake shoes 117, 118 are operated to expand by an operation of the wheel cylinder 122, in case the brake shoes expand to move relatively a predetermined distance or larger as a result of the friction linings 119, 120 being worn through friction against the brake drum, the adjustment lever 132 rotates clockwise as viewed in FIG. 3 about an axis of the pivot 133 by means of the spring force of the tertiary coil spring 134. Then, the ratchet wheel 131 is rotated to thereby feed the screw shaft 130 leftwards as viewed in FIG. 3, whereby the effective length of the contracting position control strut 128 is increased for correction.

An upper end portion of a parking brake lever 135 which extends vertically so as to partially overlap the primary brake shoe 117 as viewed from a transversely outer side of the disc brake 115 is connected to the upper portion of the primary brake shoe 117 via a pin 136. Then, the primary engagement portion 129a, which the cylindrical body 129 of the contracting position control strut 128 includes, is brought into engagement with an upper portion of the parking brake lever 135.

Figure 3:
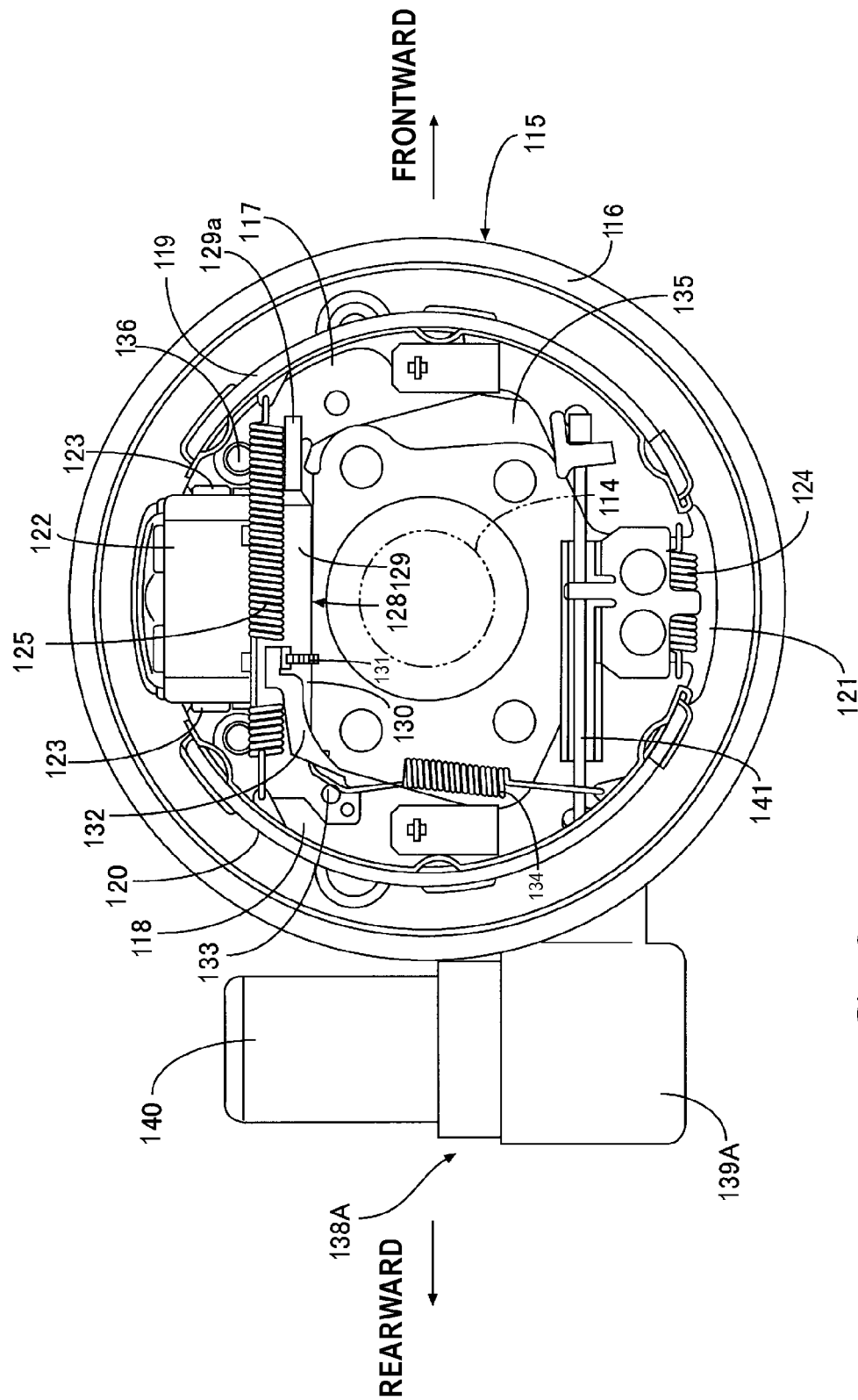
FIG. 3 is a front view of the main part of the right rear wheel drum brake as viewed from the transversely outer side of the vehicle.

When the vehicle is parked, the parking brake lever 135 is driven to rotate clockwise as viewed in FIG. 3, that is, to the rear of the front-to-rear direction of the vehicle. As a result of the parking brake lever 135 rotating in that way, a force acts on the secondary brake shoe 118 via the contracting position control strut 128 in a direction in which the friction lining 120 of the secondary brake shoe 118 is pressed against an inner circumference of the brake drum.

When the parking brake lever 135 continues to be driven to rotate clockwise as viewed in FIG. 3, the parking brake lever 135 rotates about an engagement point with the primary engagement portion 129a of the contracting position control strut 128 as a fulcrum. Then, the primary brake shoe 117 operates to expand via the pin 136 this time, whereby the friction lining 119 of the primary brake shoe 117 is pressed against the inner circumference of the brake drum.

Namely, the friction linings 119, 120 of the primary and secondary brake shoes 117, 118 are pressed against the inner circumference of the brake drum to obtain a parking brake applied state.

The parking brake lever 135 is driven by power which is exhibited by an electric actuator 138A. When the drum brake 115 is mounted on the vehicle, this electric actuator 138A is disposed and fixed further rearwards than the axle 114 of the right rear wheel.

The drum brake 115 is attached to the right rear wheel in a posture such that the drum brake 115 performs a braking operation in response to an operation of the parking brake lever 135 towards the rear in the front-to-rear direction of the vehicle, and the electric actuator 138A is connected to the parking brake lever 135 such that, when in operation, the electric actuator 138A drives the parking brake lever 135 towards the rear of the front-to-rear direction of the vehicle.

The electric actuator 138A includes an electric motor 140 which is attached to a casing 139A with its rotational axis oriented in a vertical direction and a power converting mechanism (not shown) which is incorporated in the casing 139A so as to convert the rotational power of the electric motor 140 into a force acting in a straight line. When the drum brake 115 is mounted on the vehicle, the casing 139A of the electric actuator 138A is attached to an external surface of the backing plate 116 of the drum brake 115 so as to be positioned further rearwards than the axle 114 of the right rear wheel.

Power from the electric actuator 138A is transferred to a lower end portion of the parking brake lever 135 via a cable 141 which is pulled when the electric actuator 138A operates. The cable 141 passes movably through the backing plate 116 to be connected to the lower end portion of the parking brake lever 135.

Thus, while the drum brake 115 which is attached to the right rear wheel has been described heretofore, a drum brake 115 to be attached to a left rear wheel is configured in the same way as the drum brake 115 for the right rear wheel.

Next, the function of the first embodiment will be described.

The drum brakes 115 which are driven by the power exhibited by the electric actuators 138A when the vehicle is parked are attached individually to the left and right rear wheels. And, when the drum brakes are attached to the vehicle, the electric actuators 138A are disposed and fixed further rearwards than the axles 114 of the left and right rear wheels.

According to this configuration, the electric actuators 138A are disposed in a position such that the electric actuators 138A is prevented from interfering with constituent parts such as trailing arms 112 of the suspensions 111 most of the constituent parts of which are disposed further forwards than the axles 114. This can not only enhance the degree of freedom in laying out the electric actuators 138A but also prevent the risk of stone thrown by the front wheel striking the electric actuators 138A.

The drum brake 115 which has the parking brake lever 135 which is driven when the parking brake is applied is attached to each of the left and right rear wheels in a posture such that the drum brake 115 performs a braking operation in response to an operation of the parking brake lever 135 towards the rear in the front-to-rear direction of the vehicle, and the electric actuator 138A is connected to the parking brake lever 135 such that, when in operation, the electric actuator 138A drives the parking brake lever 135 towards the rear of the front-to-rear direction of the vehicle.

Thus, this embodiment can be applied to a known drum brake 115 having a parking brake lever 135. Even in the conventionally known drum brake 115 in which the parking brake lever 135 is pulled towards the front of the front-to-rear direction of the vehicle to produce a parking brake applied state, the configuration of this embodiment can be obtained by reversing the direction of the drum brakes 115 in relation to the front-to-rear direction when they are attached to the left and right rear wheels. Thus, the existing drum brakes 115 can be used effectively, thereby enhancing the applicability of the drum brake 115.

The electric actuator 138A is attached to the backing plate 116 of the drum brake 115, which obviates the necessity of providing a specific attaching construction for attaching the electric actuator 138A on the body of the vehicle. This enables the electric actuator 138A to be assembled to the drum brake 115 closely and neatly, whereby not only can the laying-out properties of the drum brake 115 on the body be enhanced, but also the assemblage of the drum brake to the body can be facilitated.

Second Embodiment

Figure 4:
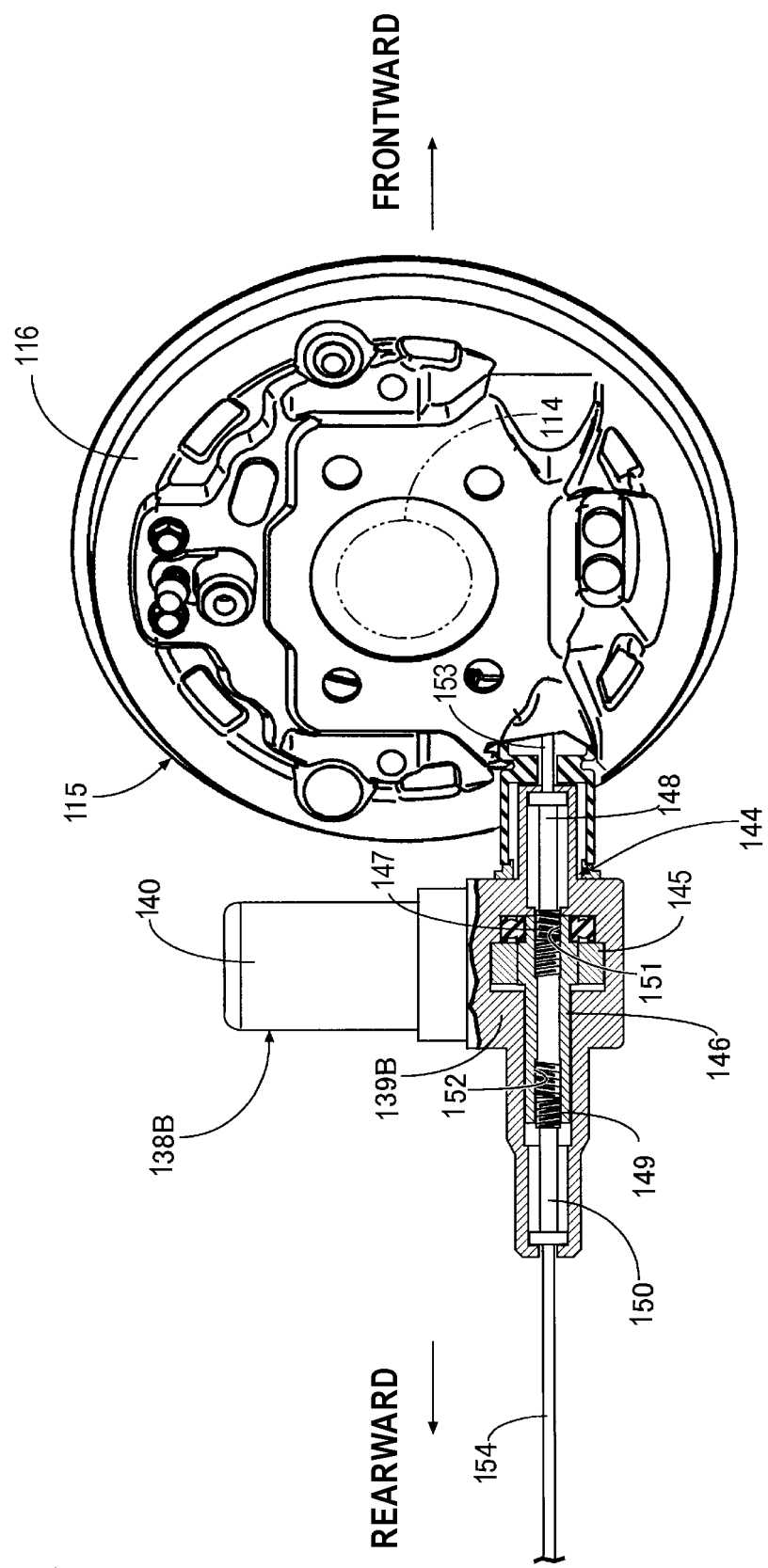
FIG. 4 is a partially cutaway perspective view of a main part of a left rear wheel drum brake of a second embodiment as viewed from a transversely inner side of the vehicle.
Figure 5:
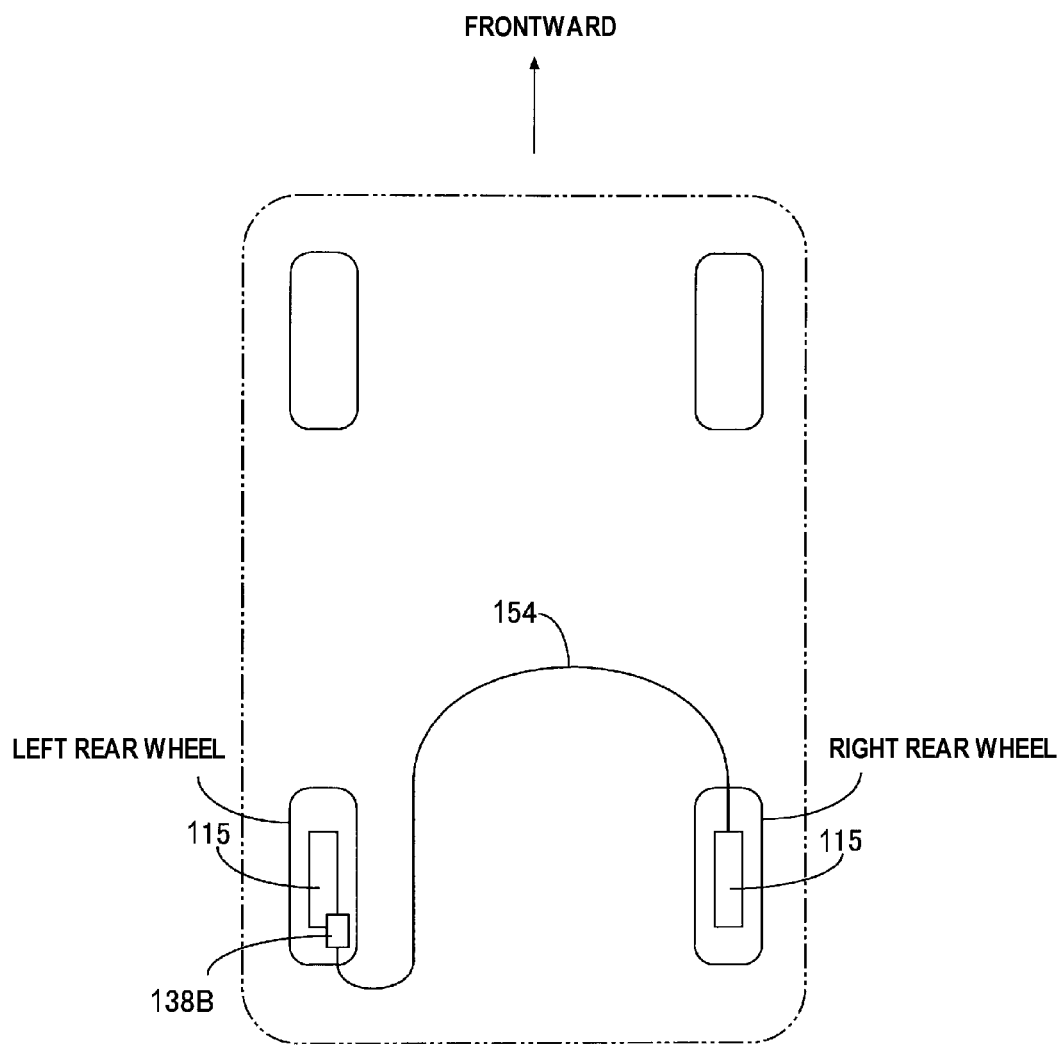
FIG. 5 is a schematic view showing a parking brake power transfer system of left and right rear wheel drum brakes of a four-wheeled vehicle.
Figure 6:
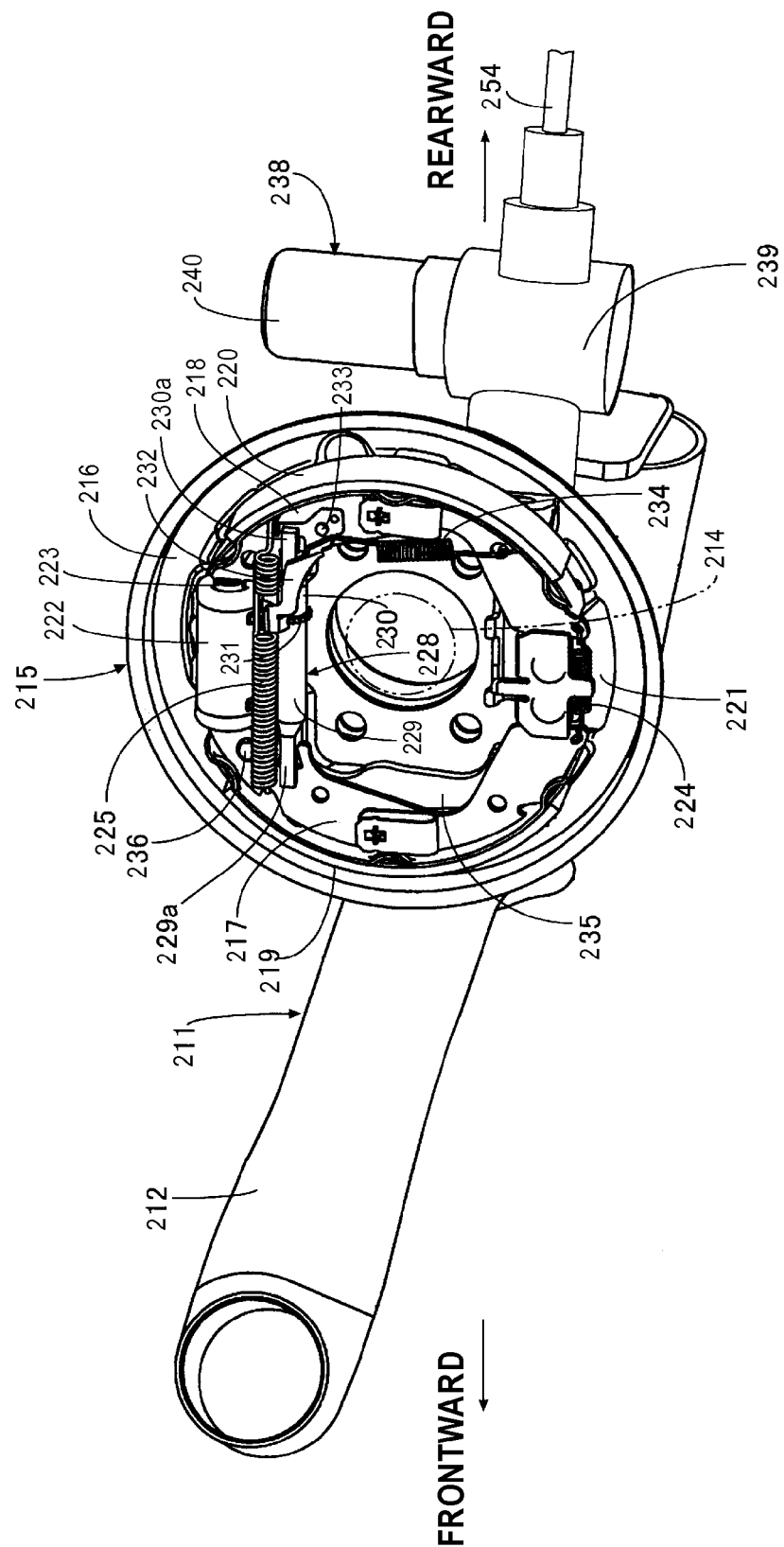
FIG. 6 is a perspective view of a main part of a left rear wheel drum brake of a third embodiment as viewed from a transversely outer side of a vehicle.
Figure 7:
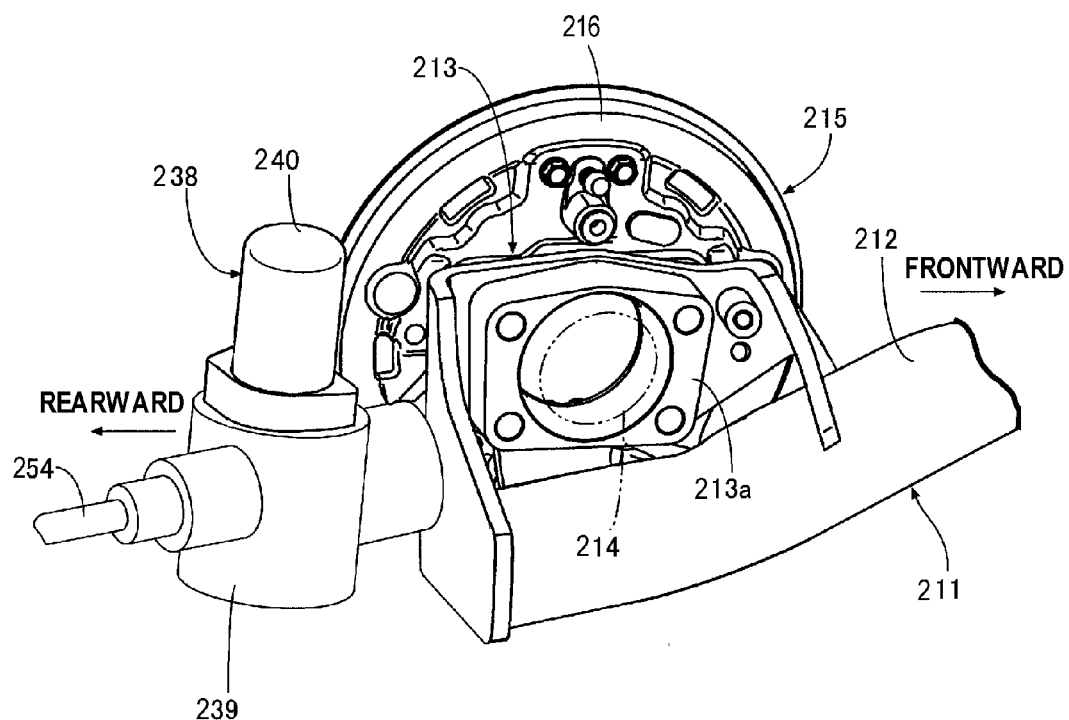
FIG. 7 is a perspective view of the main part of the left rear wheel drum brake as viewed from an opposite side to the side from which the same brake drum is viewed in FIG. 6.

Referring to FIGS. 4 and 5, a second embodiment will be described. Like reference numerals will be given to like portions to those of the first embodiment, and the like portions will only be illustrated and the detailed description thereof will be omitted here.

Firstly, in FIG. 4, an electric actuator 138B, which is configured to be activated to operate when a four-wheeled vehicle is parked, is attached to a backing plate 116 of a drum brake 115 which is mounted on a left rear wheel of the vehicle. When the drum brake 115 is attached to the vehicle, the electric actuator 138B is be disposed further rearwards than an axle 114 of the left rear wheel.

The electric actuator 138B includes an electric motor 140 which is attached to a casing 139B with its rotational axis oriented in a vertical direction and a power converting mechanism 144 which is incorporated in the casing 139B so as to convert the rotational power of the electric motor 140 into a force acting in a straight line.

Part of the power converting mechanism 144 includes a gear 145 which rotates in response to an operation of the electric motor 140, a circular rotational cylinder 146 which passes concentrically through the gear 145 to be fixed to the gear 145, a primary transfer shaft 148 having integrally a primary externally threaded portion 147 which is screwed into one end portion of the circular rotational cylinder 146 and a secondary transfer shaft 150 having integrally a secondary externally threaded portion 149 which is screwed into the other end portion of the circular rotational cylinder 146.

A primary internally threaded portion 151 into which the primary externally threaded portion 147 is screwed and a secondary internally threaded portion 152 into which the secondary externally threaded portion 149 is screwed are formed on an inner circumference of the circular rotational cylinder 146 separately on both sides of an axially central portion of the circular rotational cylinder 146.

The primary externally threaded portion 147 and the primary internally threaded portion 151, as well as the secondary externally threaded portion 149 and the secondary internally threaded portion 152 are formed such that the primary and secondary transfer shafts 148, 150 are pulled into the circular rotational cylinder 146 by rotation of the circular rotational cylinder 146 in response to an operation of the electric motor 140.

A cable 153, which is connected to the primary transfer shaft 148 at one end portion thereof, passes movably through the backing plate 116 of the drum brake 115 and is then connected to a parking brake lever so as to produce a parking brake applied state in the drum brake 115 for the left rear wheel when pulled.

On the other hand, a conventionally known drum brake 115 is mounted on a right rear wheel in which a parking brake applied state can be obtained by pulling a parking brake lever towards the front in the front-to-rear direction of the vehicle.

As shown in FIG. 5, a cable 154 which is connected to the secondary transfer shaft 150 at one end portion thereof is routed to the drum brake 115 which is mounted on the right rear wheel and is then connected to the parking brake lever of the drum brake 115 on the right rear wheel from a front side in the front-to-rear direction of the vehicle.

According to the second embodiment, the electric actuator 138B is attached to the backing plate 116 of the drum brake 115 on the left rear wheel. And, when the drum brake 115 is mounted on the vehicle, the electric actuator 138B is disposed further rearwards than the axle 114 of the left rear wheel. Therefore, as with the first embodiment, the electric actuator 138B is disposed in a position such that the electric actuator 138B is suppressed from interfering with constituent parts of the suspension 111 most of the constituent parts of which are disposed further forwards than the axle 114.

This can not only enhance the degree of freedom in laying out the electric actuators 138B but also prevent the risk of stone thrown by the front wheel striking the electric actuator 138B. Additionally, this configuration obviates the necessity of an exclusive electric actuator 138B for the drum brake 115 which is mounted on the right rear wheel to produce a parking brake applied state in the right rear wheel drum brake 115, thereby reducing the production costs.

Third Embodiment

A third embodiment will be described by reference to FIGS. 6 to 10. Firstly, in FIGS. 6 to 8, a knuckle 213 having a frame portion 213a is fixed to a rear end of a trailing arm 212 extending in a front-to-rear direction of a four-wheeled vehicle which makes up part of a suspension 211 by which a left rear wheel which is one of left and right rear wheels of the four-wheeled vehicle is supported on a body of the vehicle in a suspended fashion. An axle 214 of the left rear wheel which is disposed on a transversely outer side of the frame portion 213a is supported rotatably on the frame portion 213a.

A wheel brake which is provided on the left rear wheel is a drum brake 215, and a backing plate 216 of this drum brake 215 is secured to the frame portion 213a. An anchor block 221 is fixedly provided at a lower portion of the backing plate 216, and this anchor block 221 constitutes a fulcrum on which a set of front primary brake shoe 217 and rear secondary brake shoe 218 expand or contract. Friction linings 219, 220, which are configured to rotate together with the left rear wheel, are joined to outer circumferences of the primary and secondary brake shoes 217, 218, respectively, so as to be brought into sliding contact with a brake drum (not shown).

A wheel cylinder 222, which is configured to exhibit an expanding force to expand the primary and secondary brake shoes 217, 218 so as to move away from each other, is fixed to an upper portion of the backing plate 216 such that outer ends of a pair of pistons 223 of the wheel cylinder 222 face upper end portions of the primary and secondary brake shoes 217, 218.

This wheel cylinder 222 is activated to operate by a hydraulic pressure outputted from a master cylinder (not shown) which is operated by a brake pedal to thereby drive the primary and secondary brake shoes 217, 218 in a direction in which they expand.

A primary coil spring 224 is provided between lower end portions of the primary and secondary brake shoes 217, 218 so as to bias the lower end portions of the primary and secondary brake shoes 217, 218 towards the anchor block 221, while a secondary coil spring 225 is provided between the upper end portions of the primary and secondary brake shoes 217, 218 so as to bias the brake shoes 217, 218 in a direction in which they contract.

A contracting position control strut 228 is provided between upper portions of the primary and secondary brake shoes 217, 218 so as to control contracting positions of the primary and secondary brake shoes 217, 218. This contracting position control strut 228 includes a cylindrical body 229 having at one end thereof a primary engagement portion 229a which is brought into engagement with the upper portion of the primary brake shoe 217 of the primary and secondary brake shoes 217, 218, a screw shaft 230 having at the other end portion a secondary engagement portion 230a which is inserted, at one end portion thereof, into the cylindrical body 229 so as to move in an axial direction relative to the cylindrical body 229 and which is brought into engagement with the upper portion of the secondary brake shoe 218, and a ratchet wheel 231 which is screwed on the screw shaft 230 so as to be brought into abutment with the other end of the cylindrical body 229.

An adjustment lever 232 which is in engagement with an outer circumference of the ratchet wheel 231 is supported rotatably on the secondary brake shoe 218 via a pivot 233, and a tertiary coil spring 234 is provided between the secondary brake shoe 218 and the adjustment lever 232.

Figure 8:
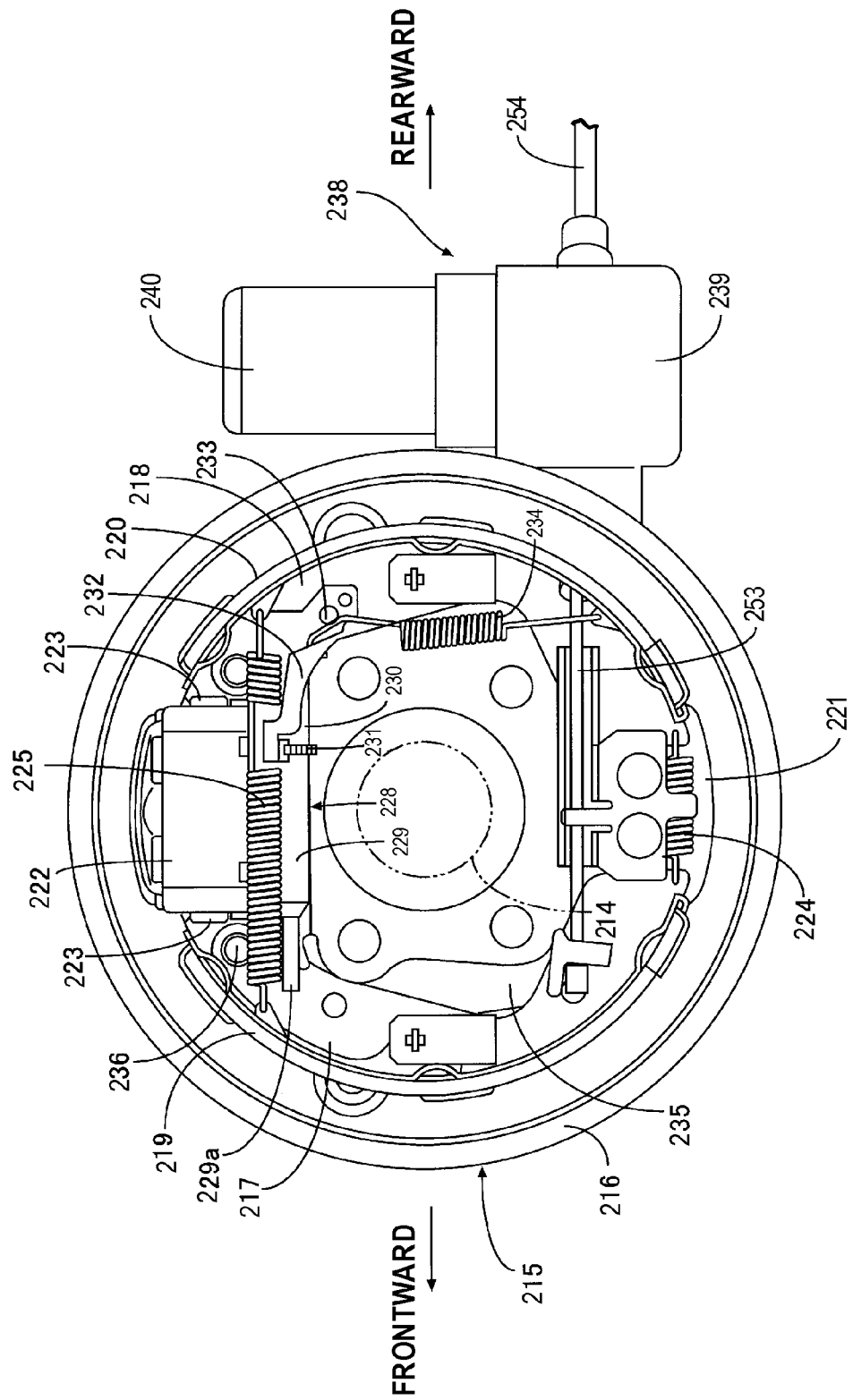
FIG. 8 is a front view of the main part of the left rear wheel drum brake as viewed from the transversely outer side of the vehicle.

When the primary and secondary brake shoes 217, 218 are operated to expand by an operation of the wheel cylinder 222, in case the brake shoes expand to move relatively a predetermined distance or larger as a result of the friction linings 219, 220 being worn through friction against the brake drum, the adjustment lever 232 rotates clockwise as viewed in FIG. 8 about an axis of the pivot 233 by means of the spring force of the tertiary coil spring 234. Then, the ratchet wheel 231 is rotated to thereby feed the screw shaft 230 leftwards as viewed in FIG. 8, whereby the effective length of the contracting position control strut 228 is increased for correction.

An upper end portion of a parking brake lever 235 which extends vertically so as to partially overlap the primary brake shoe 217 as viewed from a transversely outer side of the disc brake 215 is connected to the upper portion of the primary brake shoe 217 via a pin 236. Then, the primary engagement portion 229a, which the cylindrical body 229 of the contracting position control strut 228 includes, is brought into engagement with an upper portion of the parking brake lever 235.

When the vehicle is parked, the parking brake lever 235 is driven to rotate clockwise as viewed in FIG. 8, that is, to the rear of the front-to-rear direction of the vehicle. As a result of the parking brake lever 235 rotating in that way, a force acts on the secondary brake shoe 218 via the contracting position control strut 228 in a direction in which the friction lining 220 of the secondary brake shoe 218 is pressed against an inner circumference of the brake drum.

When the parking brake lever 235 continues to be driven to rotate counterclockwise as viewed in FIG. 8, the parking brake lever 235 rotates about an engagement point with the primary engagement portion 229a of the contracting position control strut 228 as a fulcrum. Then, the primary brake shoe 217 operates to expand via the pin 236 this time, whereby the friction lining 219 of the primary brake shoe 217 is pressed against the inner circumference of the brake drum.

Namely, the friction linings 219, 220 of the primary and secondary brake shoes 217, 218 are pressed against the inner circumference of the brake drum to obtain a parking brake applied state.

Figure 9:
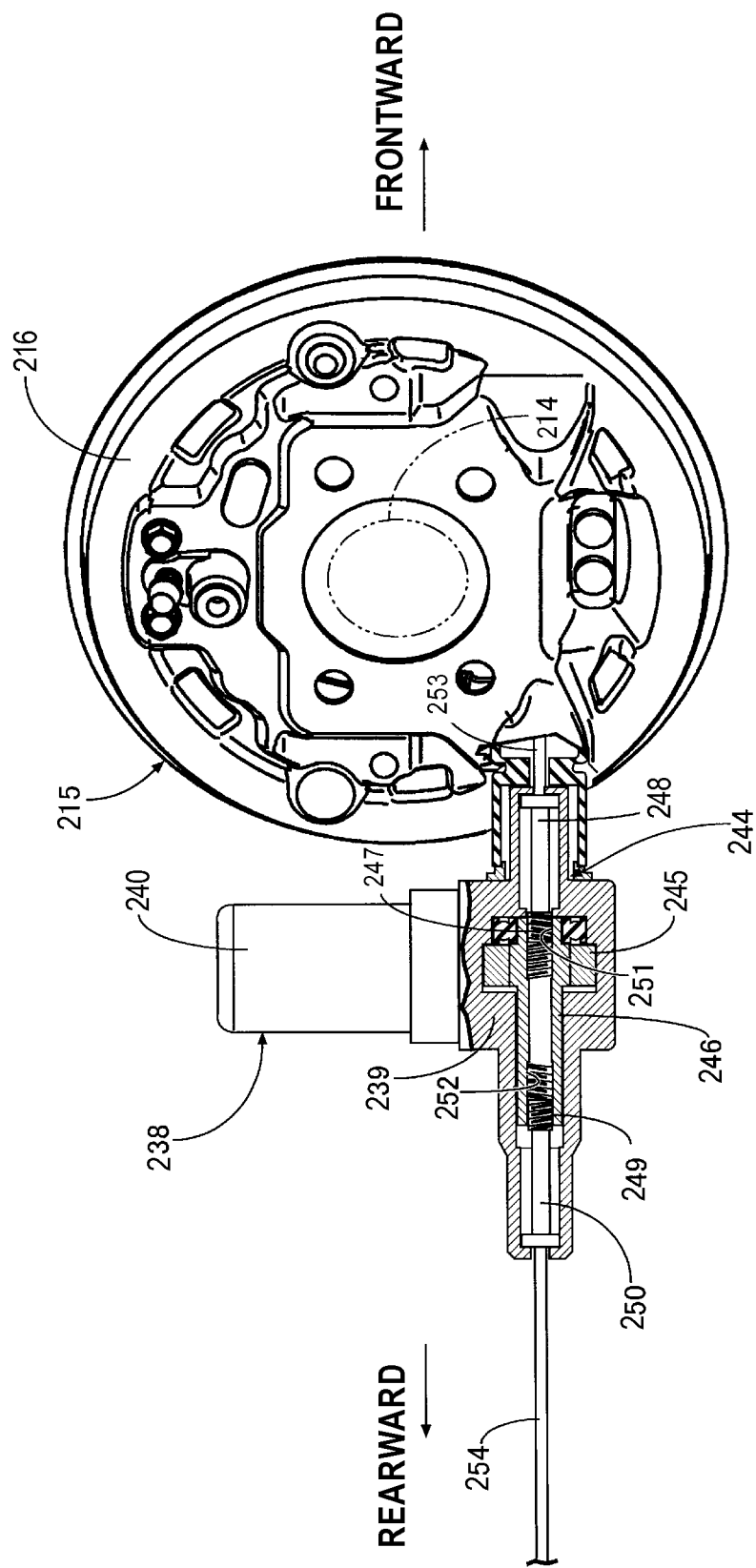
FIG. 9 is a partially cutaway perspective view of the main part of the left rear wheel drum brake as viewed from a transversely inner side of the vehicle.

Referring to FIG. 9 together, the parking brake lever 235 is driven by power which is exhibited by an electric actuator 238. And, when the drum brake 215 is mounted on the vehicle, the electric actuator 238 is disposed and fixed further rearwards than the axle 214 of the left rear wheel.

The drum brake 215 is attached to the left rear wheel in a posture such that the drum brake 215 performs a braking operation in response to an operation of the parking brake lever 235 towards the rear in the front-to-rear direction of the vehicle, and the electric actuator 238 is connected to the parking brake lever 235 such that, when in operation, the electric actuator 238 pulls the parking brake lever 235 towards the rear of the front-to-rear direction of the vehicle.

The electric actuator 238 includes an electric motor 240 which is attached to a casing 239 with its rotational axis oriented in a vertical direction and a power converting mechanism 244 which is incorporated in the casing 239 so as to convert the rotational power of the electric motor 240 into a force acting in a straight line.

Part of the power converting mechanism 244 includes a gear 245 which rotates in response to an operation of the electric motor 240, a circular rotational cylinder 246 which passes concentrically through the gear 245 to be fixed to the gear 245, a primary transfer shaft 248 having integrally a primary externally threaded portion 247 which is screwed into one end portion of the circular rotational cylinder 246 and a secondary transfer shaft 250 having integrally a secondary externally threaded portion 249 which is screwed into the other end portion of the circular rotational cylinder 246.

A primary internally threaded portion 251 into which the primary externally threaded portion 247 is screwed and a secondary internally threaded portion 252 into which the secondary externally threaded portion 249 is screwed are formed on an inner circumference of the circular rotational cylinder 246 separately on both sides of an axially central portion of the circular rotational cylinder 246.

The primary externally threaded portion 247 and the primary internally threaded portion 251, as well as the secondary externally threaded portion 249 and the secondary internally threaded portion 252 are formed such that the primary and secondary transfer shafts 248, 250 are pulled into the circular rotational cylinder 246 in response to an operation of the electric motor 240.

A cable 253, which is connected to the primary transfer shaft 248 at one end portion thereof, passes movably through the backing plate 216 of the drum brake 215 and is then connected to a parking brake lever 235 so as to produce a parking brake applied state in the drum brake 215 for the left rear wheel when pulled.

On the other hand, a conventionally known drum brake 215 is mounted on a right rear wheel in which a parking brake applied state can be obtained by pulling a parking brake lever towards the front in the front-to-rear direction of the vehicle. Namely, the parking brake levers 235 of the drum brakes 215 which are provided individually on the left and right rear wheels are set to be pulled in the opposite directions to each other in relation to the front-to-rear direction of the vehicle.

Figure 10:
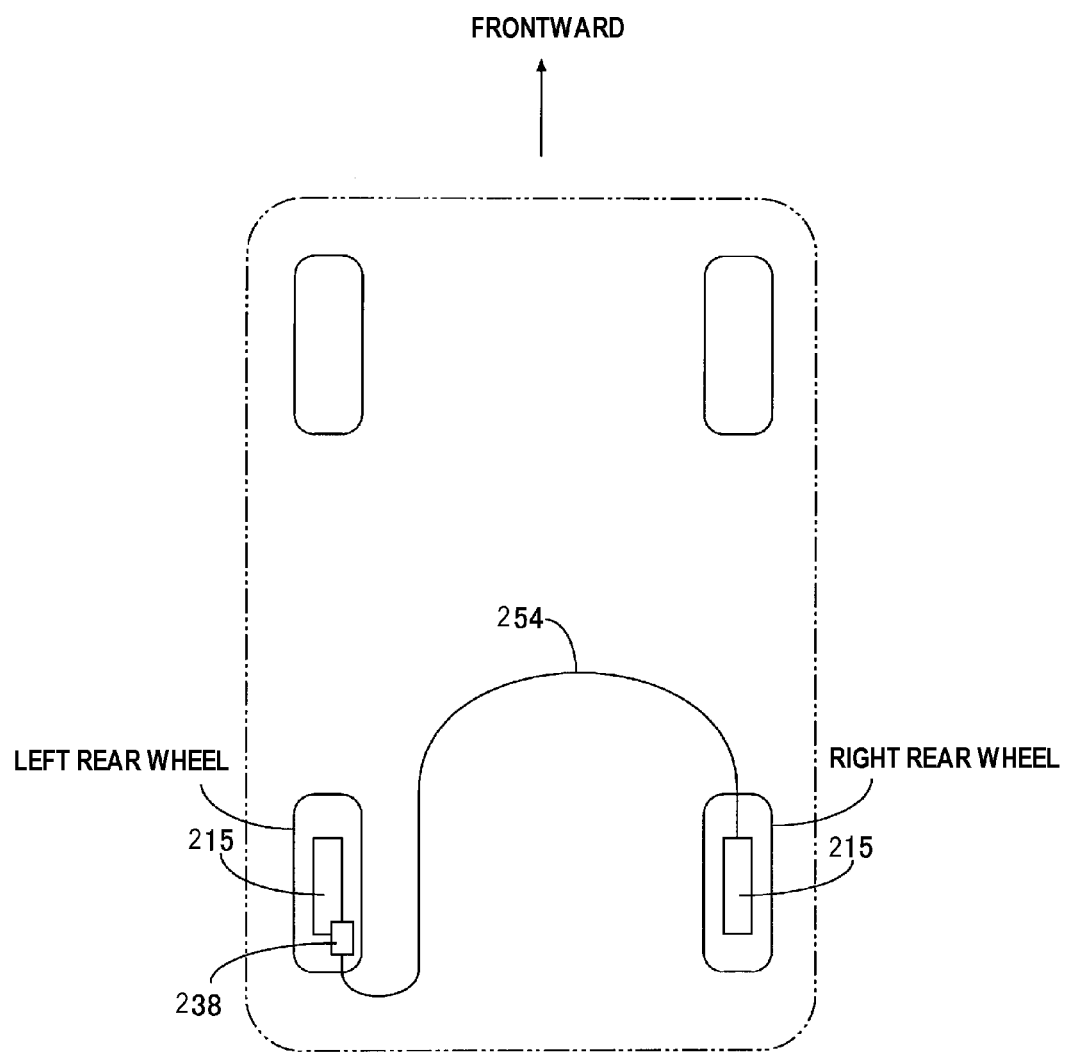
FIG. 10 is a schematic view showing a parking brake power transfer system of left and right rear wheel drum brakes of a four-wheeled vehicle.

A cable 254 is connected to the secondary transfer shaft 250 at one end portion thereof so as to transfer the power from the electric actuator 238, and this cable 254 is routed from the electric actuator 238 to the drum brake 215 provided on the right rear wheel, as shown in FIG. 10, to thereby be connected to the parking brake lever in the right rear wheel drum brake 215 from a front side in the front-to-rear direction of the vehicle.

Next, the function of the embodiment will be described. The electric actuator 238 is provided on the drum brake 215 as the wheel brake provided on the left rear wheel which is one of the left and right rear wheels, and this electric actuator exhibits the power by which not only the wheel brake on the left rear wheel but also the wheel brake on the right rear wheel which is the other of the left and right rear wheels are driven. Therefore, the necessity is obviated of providing any specific attaching construction such as a bracket for attaching the electric actuator to the vehicle, thereby enhancing the attaching properties of the electric actuator 238.

The cable 254 is routed to transfer the power from the electric actuator 238 to the drum brake 215 provided on the right rear wheel. Therefore, the cable 254 should be routed between the left and right rear wheels, thereby enhancing the degree of freedom in laying out the cable to be routed.

This embodiment can be preferably be applied to the known drum brake 215 having the parking brake lever 235. Although the known drum brake 215 is such that the parking brake applied state is produced by pulling the parking brake lever 235 to the front in the front-to-rear direction of the vehicle, two such drum brakes 215 are prepared, and a parking brake lever 235 of one drum brake 215 is set to be pulled towards the rear, while a parking brake lever 235 in the other drum brake 215 is set to be pulled to the front in the front-to-rear direction of the vehicle, whereby the known drum brakes 215 can be used on the left and right rear wheels. This enables the effective use of the existing drum brakes 215 and can enhance the applicability thereof.

The electric actuator 238 is disposed rearwards than axis 214 on the drum brake 215 which is provided on the left rear wheel with the parking brake lever 235 set to be pulled to the rear in the front-to-rear direction of the vehicle. This means that the electric actuator 238 is disposed in a position such that the electric actuator 238 is suppressed from interfering with a constituent part of the suspension 211 most of constituent parts of which are disposed further forwards than the axle 214, and this can enhance the degree of freedom in laying out the electric actuator 238. In addition, it is possible to avoid the risk of stone thrown by the front wheel striking the electric actuator 238.

Fourth Embodiment

Figure 12:
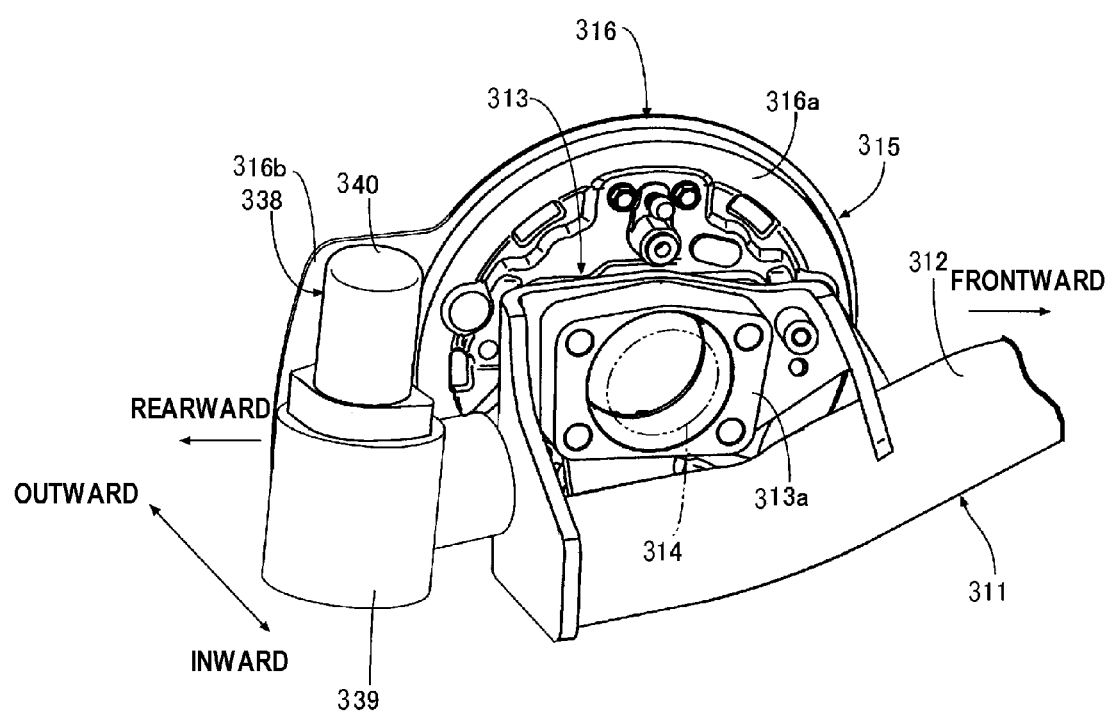
FIG. 12 is a perspective view of the main part of the rear wheel drum brake as viewed from a transversely inner side of the vehicle.
Figure 13:
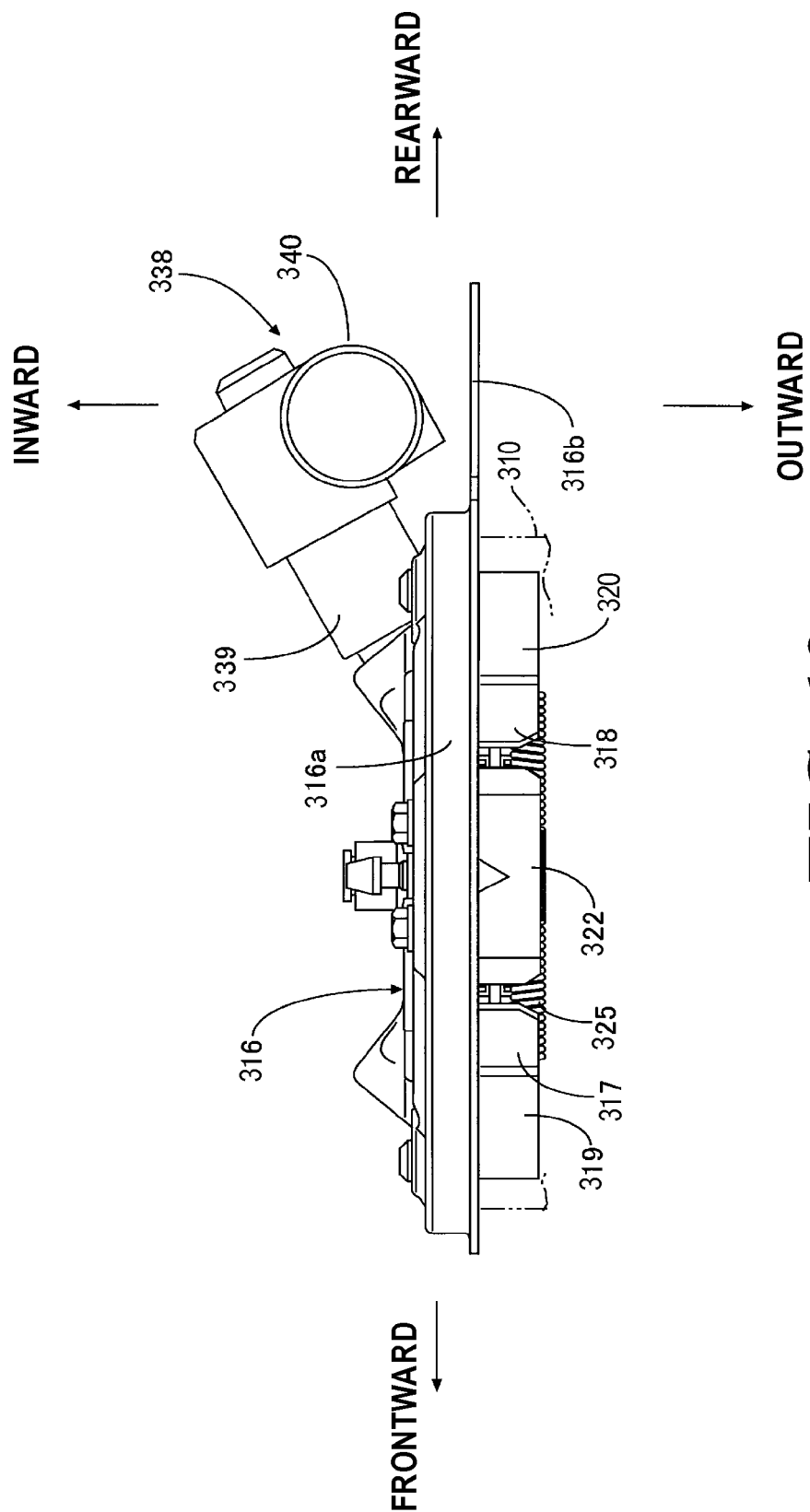
FIG. 13 is a view showing the main part of the rear wheel drum brake as viewed from a direction indicated by an arrow 3 in FIG. 11.

A fourth embodiment will be described by reference to FIGS. 11 to 13 appended hereto. A knuckle 313 having a frame portion 313*a* is fixed to a rear end of a trailing arm 312 extending in a front-to-rear direction of a four-wheeled vehicle which makes up part of a suspension 311 by which a right rear wheel is supported on a body of the four-wheeled vehicle in a suspended fashion. An axle 314 of the right rear wheel which is disposed on a transversely outer side of the frame portion 313*a* is supported rotatably on the frame portion 313*a*.

A backing plate 316 of a drum brake 315 which is mounted on the right rear wheel is secured to the frame portion 313*a*. An anchor block 321 is fixedly provided at a lower portion of the backing plate 316, and this anchor block 321 constitutes a fulcrum on which a set of front primary brake shoe 317 and rear secondary brake shoe 318 expand or contract. Friction linings 319, 320, which are configured to rotate together with the right rear wheel, are joined to outer circumferences of the primary and secondary brake shoes 317, 318, respectively, so as to be brought into friction contact with a brake drum 310.

A wheel cylinder 322, which is configured to exhibit an expanding force to expand the primary and secondary brake shoes 317, 318 so as to move away from each other, is fixed to an upper portion of the backing plate 316 such that outer ends of a pair of pistons 323 of the wheel cylinder 322 face upper end portions of the primary and secondary brake shoes 317, 318.

This wheel cylinder 322 is activated to operate by a hydraulic pressure outputted from a master cylinder (not shown) which is operated by a brake pedal to thereby drive the primary and secondary brake shoes 317, 318 in a direction in which they expand.

A primary coil spring 324 is provided between lower end portions of the primary and secondary brake shoes 317, 318 so as to bias the lower end portions of the primary and secondary brake shoes 317, 318 towards the anchor block 321, while a secondary coil spring 325 is provided between the upper end portions of the primary and secondary brake shoes 317, 318 so as to bias the brake shoes 317, 318 in a direction in which they contract.

A contracting position control strut 328 is provided between upper portions of the primary and secondary brake shoes 317, 318 so as to control contracting positions of the primary and secondary brake shoes 317, 318. This contracting position control strut 328 includes a cylindrical body 329 having at one end thereof an engagement portion 329*a* which is brought into engagement with the upper portion of the primary brake shoe 317 of the primary and secondary brake shoes 317, 318, a screw shaft 330 having at the other end portion an engagement portion (not shown) which is inserted, at one end portion thereof, into the cylindrical body 329 so as to move in an axial direction relative to the cylindrical body 329 and which is brought into engagement with the upper portion of the secondary brake shoe 318, and a ratchet wheel 331 which is screwed on the screw shaft 330 so as to be brought into abutment with the other end of the cylindrical body 329.

An adjustment lever 332 which is in engagement with an outer circumference of the ratchet wheel 331 is supported rotatably on the secondary brake shoe 318 via a pivot 333, and a tertiary coil spring 334 is provided between the secondary brake shoe 318 and the adjustment lever 332.

Figure 11:
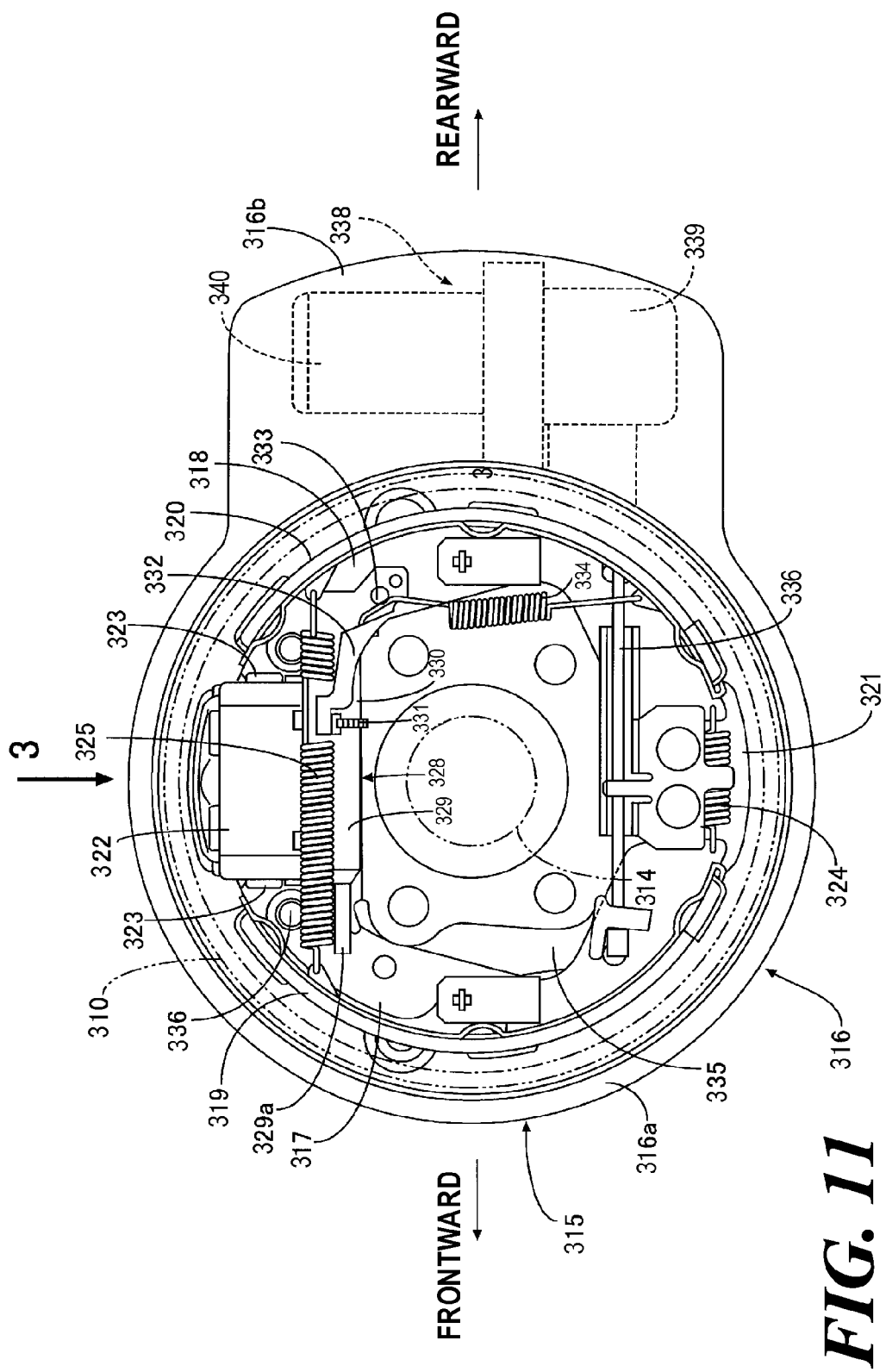
FIG. 11 is a side view of a main part of a rear wheel drum brake of a fourth embodiment as viewed from a transversely outer side of a vehicle.

When the primary and secondary brake shoes 317, 318 are operated to expand by an operation of the wheel cylinder 322, in case the brake shoes expand to move relatively a predetermined distance or larger as a result of the friction linings 319, 320 being worn through friction against the brake drum 310, the adjustment lever 332 rotates clockwise as viewed in FIG. 11 about an axis of the pivot 333 by means of the spring force of the tertiary coil spring 334. Then, the ratchet wheel 331 is rotated to thereby feed the screw shaft 330 leftwards as viewed in FIG. 11, whereby the effective length of the contracting position control strut 328 is increased for correction.

An upper end portion of a parking brake lever 335 which extends vertically so as to partially overlap the primary brake shoe 317 as viewed from a transversely outer side of the disc brake 315 is connected to the upper portion of the primary brake shoe 317 via a pin 336. Then, the engagement portion 329*a*, which the cylindrical body 329 of the contracting position control strut 328 includes, is brought into engagement with an upper portion of the parking brake lever 335.

When the vehicle is parked, the parking brake lever 335 is driven to rotate clockwise as viewed in FIG. 11, that is, to the rear of the front-to-rear direction of the vehicle. As a result of the parking brake lever 335 rotating in that way, a force acts on the secondary brake shoe 318 via the contracting position control strut 328 in a direction in which the friction lining 320 of the secondary brake shoe 318 is pressed against an inner circumference of the brake drum 310.

When the parking brake lever 335 continues to be driven to rotate clockwise as viewed in FIG. 11, the parking brake lever 335 rotates about an engagement point with the engagement portion 329*a* of the contracting position control strut 328 as a fulcrum. Then, the primary brake shoe 317 operates to expand via the pin 336 this time, whereby the friction lining 319 of the primary brake shoe 317 is pressed against the inner circumference of the brake drum 310.

Namely, the friction linings 319, 320 of the primary and secondary brake shoes 317, 318 are pressed against the inner circumference of the brake drum 310 to obtain a parking brake applied state.

One end portion of a cable 336 is connected to a lower end portion of the parking brake lever 335. The parking brake lever 335 is driven to rotate by pulling to drive the cable 336 by power exhibited by the electric actuator 338. When the drum brake 315 is attached to the vehicle, the electric actuator 338 is attached to the backing plate 316 so as to be disposed further rearwards than the axle 314 of the right rear wheel.

The electric actuator 338 includes an electric motor 340 which is attached to a casing 339 with its rotational axis oriented in a vertical direction and a power converting mechanism (not shown) which is incorporated in the casing 339 so as to convert the rotational power of the electric motor 340 into a force acting in a straight line. When the drum brake 315 is mounted on the vehicle, the casing 339 of the electric actuator 338 is attached to the backing plate 316 so as to be positioned further rearwards than the axle 314 of the right rear wheel.

The backing plate 316 is formed to have a backing plate main portion 316*a* which is formed into a dish-like shape so as to accommodate therein part of the brake drum 310 and an expanding portion 316*b* which expands sideways from the backing plate main portion 316*a*. The electric actuator 338 is attached to the backing plate main portion 316*a* so as to be covered from a transversely outer side of a vehicle by the expanding portion 316*b*.

Thus, while the drum brake 315 which is attached to the right rear wheel has been described heretofore, a drum brake 315 to be attached to a left rear wheel is configured in the same way as the drum brake 315 for the right rear wheel.

Next, the function of the embodiment will be described. Since the electric actuator 338 is attached to the backing plate 316 of the drum brake 315 so as to be covered from the transversely outer side of the vehicle by the backing plate 316, the degree of freedom in laying out the electric actuator 338 can be enhanced by disposing the electric actuator 338 in a position such that the electric actuator 338 is suppressed from interfering with a constituent part of the suspension 311 or a tire of the wheel to which the drum brake 315 is attached. Since the electric actuator 338 is covered from the transversely outer side of the vehicle by the backing plate 316, it is possible to prevent the electric actuator 338 from being brought into contact with tires or wheels when tires are replaced.

The backing plate 316 is formed to have the backing plate main portion 316*a* which is formed into the dish-like shape so as to accommodate therein part of the brake drum 310 and the expanding portion 316*b* which expands sideways from the backing plate main portion 316*a*. Then, the electric actuator 338 is attached to the backing plate main portion 316*a* so as to be covered from the transversely outer side of the vehicle by the expanding portion 316*b*. Therefore, the degree of freedom in disposing the electric actuator 338 is enhanced further.

Since the electric actuator 338 is attached to the backing plate main portion 316*a* of the backing plate 316, the electric actuator 338 can be attached to the backing plate 316 strongly and rigidly.

While the embodiments have been described heretofore, the invention is not limited thereto and hence can be altered in relation to design variously without departing from the spirit and scope to be claimed.

The invention claimed is:

1. A vehicle brake apparatus, including:
   an electric actuator; and
   a drum brake which is attached to a wheel so as to be driven by power exhibited by the electric actuator,
   wherein the electric actuator includes a casing incorporating a power converting mechanism, and an electric motor overlapping with and attached to the casing, and
   wherein, in a state of being mounted on a vehicle, only the casing of the electric actuator is attached to an external surface of a backing plate of the drum brake through the casing so that the electric actuator is disposed and fixed further rearwards than an axle of the wheel.

2. The vehicle brake apparatus of claim 1,
   wherein the drum brake has a parking brake lever which is to be driven when a parking brake is applied, and the drum brake is attached to the wheel in a posture such that the drum brake performs a braking operation in response to an operation of the parking brake lever towards the rear in a front-to-rear direction of the vehicle, and
   wherein the electric actuator is connected to the parking brake lever such that, when in operation, the electric actuator drives the parking brake lever towards the rear of the front-to-rear direction of the vehicle.

3. The vehicle brake apparatus of claim 1,
   wherein the drum brake is attached to a rear wheel.

4. The vehicle brake apparatus of claim 1,
   wherein a pair of wheel brakes are provided individually on left and right rear wheels, as the wheel brake,
   wherein the electric actuator is provided on one wheel brake which is provided on one of the left and right rear wheels, and exhibits power to drive not only the one wheel brake but also another wheel brake which is provided on the other of the left and right rear wheels, and
   wherein a cable is routed to transfer the power from the electric actuator to the another wheel brake.

5. The vehicle brake apparatus of claim 4,
   wherein the wheel brakes are drum brakes each having a parking brake lever and producing a parking brake applied state therein in response to the parking brake lever being pulled, and
   wherein directions in which the parking brake levers of the drum brakes which are provided individually on the left and rear wheels are pulled are set opposite to each other in relation to a front-to-rear direction of the vehicle.

6. The vehicle brake apparatus of claim 5,
   wherein the electric actuator is provided on the one drum brake which is provided on the one of the left and right rear wheels such that the parking brake lever thereof is pulled to the rear in the front-to-rear direction of the vehicle, and in a state of being attached to the vehicle, the electric actuator is positioned further rearwards then an axle of the one of the left and right rear wheels.

7. The vehicle brake apparatus of claim 1,
   wherein the drum brake includes
      a brake drum which rotates together with the wheel,
      a backing plate which is disposed and fixed to a suspension which supports the wheel in a suspended fashion, and
      brake shoes which are supported on the backing plate so as to be brought into friction contact with the brake drum, and
   wherein the electric actuator is attached to the backing plate so as to be covered by the backing plate from a transversely outer side of a vehicle.

8. The vehicle brake apparatus of claim 7,
   wherein the backing plate includes
      a backing plate main portion formed into a partly circular shape, so as to accommodate a part of the brake drum, and
      an expanding portion which expands sideways from the backing plate main portion.

9. The vehicle brake apparatus of claim 8,
   wherein the electric actuator is attached to the backing plate main portion so as to be covered from the transversely outer side of the vehicle by the expanding portion.

10. The vehicle brake apparatus of claim 1, further comprising an anchor block fixedly provided at a lower portion of the backing plate, the anchor block constituting a fulcrum on which a set of front primary brake shoe and rear secondary brake shoe expand or contract.

11. The vehicle brake apparatus of claim 10, wherein power from the electric actuator is transferred to a parking brake lever via a cable that passes movably through the backing plate connected to the parking brake lever.

12. The vehicle brake apparatus of claim 1, wherein the electric actuator includes an electric motor attached to a casing with its rotational axis oriented in a vertical direction with respect to the axle.

13. A vehicle brake apparatus in which wheel brakes are provided individually on left and right rear wheels and are activated by an electric actuator when a vehicle is parked, wherein the electric actuator includes an electric motor attached to a casing with its rotational axis oriented in a vertical direction, the electric actuator is mounted on one wheel brake which is mounted on a hub of on one of the left and right rear wheels, and exhibits power to drive not only the one wheel brake but also another wheel brake which is mounted on the other of the left and right rear wheels, and wherein a cable is routed to transfer the power from the electric actuator to the another wheel brake, and wherein the electric actuator powers a power converting mechanism so as to convert rotational power of the electric motor into a force acting in a straight line, the power converting mechanism includes:
- a gear which rotates in response to an operation of the electric motor,
- a circular rotational cylinder which is fixed to the gear, and
- a primary transfer shaft attached to one end portion of the circular rotational cylinder and a secondary transfer shaft attached to the other end portion of the circular rotational cylinder and the cable, and
- a second cable connected to the primary transfer shaft at one end portion thereof, and which passes movably through a backing plate of the wheel brake and connected to a parking brake lever so as to produce a parking brake applied state in the wheel brake.

14. The vehicle brake apparatus of claim 13, further comprising:
- a primary internally threaded portion into which a primary externally threaded portion is attached and a secondary internally threaded portion into which a secondary externally threaded portion is attached are formed on an inner circumference of the circular rotational cylinder separately on both sides of an axially central portion of the circular rotational cylinder, wherein the primary externally threaded portion, the primary internally threaded portion, the secondary externally threaded portion and the secondary internally threaded portion are formed such that the primary and secondary transfer shafts are pulled into the circular rotational cylinder in response to an operation of the electric motor.

15. A vehicle brake apparatus, including:
a drum brake including
- a brake drum which rotates together with a wheel,
- a backing plate which is disposed and fixed to a suspension which supports the wheel in a suspended fashion, and
- brake shoes which are supported on the backing plate so as to be brought into friction contact with the brake drum; and an electric actuator which exhibits power to rotate the brake shoes, wherein a casing of the electric actuator is mounted directly to a main portion of the backing plate so as to be covered by an expanding portion which expands sideways from the main portion of the backing plate from a transversely outer side of a vehicle and in a position behind suspension parts which are disposed further forwards than an axle thereby suppressing the electric actuator from interfering with the suspension parts.

16. The vehicle brake apparatus of claim 15, wherein the electric actuator includes an electric motor attached to a casing with its rotational axis oriented in a vertical direction with respect to the axle.

* * * * *